Inventors
J. Roumens
R. Floury
By Wenderoth, Lind & Ponack
Attorneys

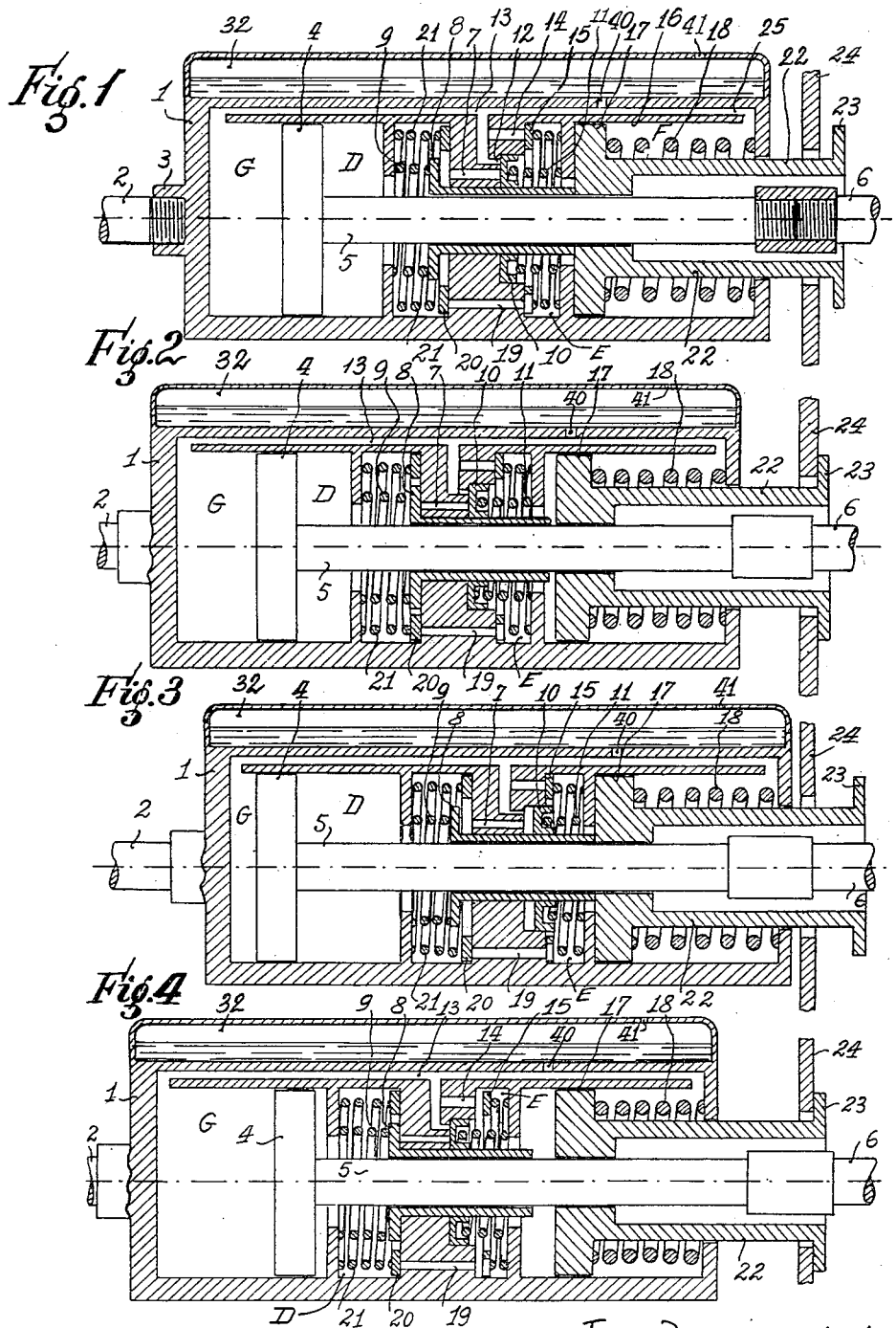

Oct. 16, 1956  J. ROUMENS ET AL  2,766,854
BRAKE SLACK ADJUSTER OR EQUIVALENT
Filed March 22, 1951  4 Sheets-Sheet 3

Inventors
J. Roumens
R. Floury
By Wenderoth, Lind & Ponack
Attorneys

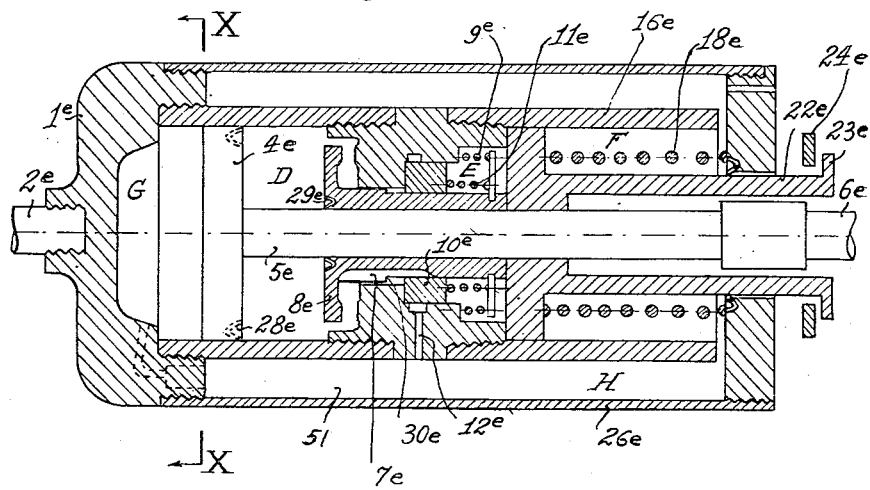
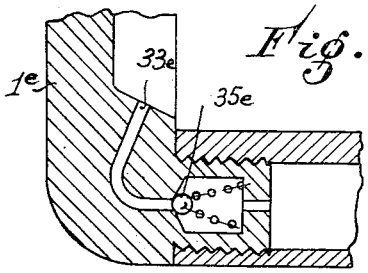
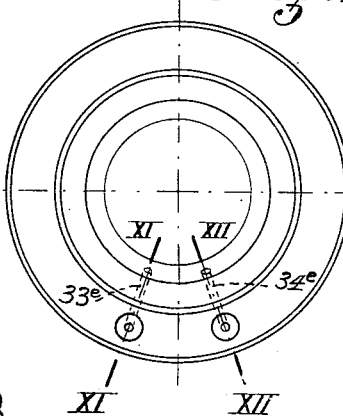
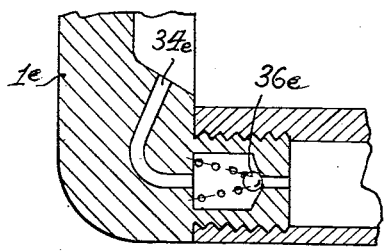

United States Patent Office 2,766,854
Patented Oct. 16, 1956

2,766,854

BRAKE SLACK ADJUSTER OR EQUIVALENT

Jean Roumens, Boulogne-Billancourt, and René Floury, Sarcelles, France

Application March 22, 1951, Serial No. 216,922

5 Claims. (Cl. 188—196)

This application is a continuation-in-part of Application Serial No. 599,112, filed June 12, 1945, now abandoned.

The present invention relates to a device for automatically regulating the length of a force transmitting member and is particularly applicable to railway brake gearing. In devices of this type, the transmission of the braking force comprises successively a so-called "approach period" during which the brake shoe is not yet in contact with the rim of the wheel and the force to be transmitted is only several tens of kilograms, then a so-called "action period" during which the brake shoe bears against the rim of the wheel and the transmitted force amounts to several tons. It is an object of the invention to improve devices of the above character.

It is generally endeavored, in the transmission of forces of this type, to initiate the action period after a given displacement of the control member. However, it is necessary at the end of a certain time, owing to wear and play, to modify the length of the transmission means in order to avoid too long a stroke for the control member before the action period begins. Similarly, when one of the elements of the transmission is replaced, after becoming worn for instance, it is necessary to modify in the reverse direction the length of the transmission means in order to avoid initiation of the action period before the control member has completed the provided stroke. It is also an object to improve constructions of the above type.

A further object of the invention is to provide a construction wherein the control member and the controlled member are respectively connected to two elements such as a cylinder and a piston between which a liquid is interposed, whereby a high pressure chamber and a low pressure chamber are formed respectively on one and the other sides of the piston with an interposed connection, the quantity of said liquid being changed according to the necessity of increasing or of decreasing the length of the transmission.

A still further object of the invention is to provide means whereby the necessary adjustments of the rod line are produced automatically.

With the above and other objects in view which will become apparent from the detailed description below, various embodiments of presently preferred constructions are described and shown in the drawings in which:

Figures 1 to 4 illustrate in cross-section a first device according to the present invention with the elements thereof in four different positions.

Figures 5 to 9 show in cross-section some variants of the device shown in Figure 1.

Figures 10 to 12 show cross-sections taken respectively along the section line X—X of the device shown in Figure 9 and the section lines XI—XI and XII—XII of Figure 10.

Figure 5:
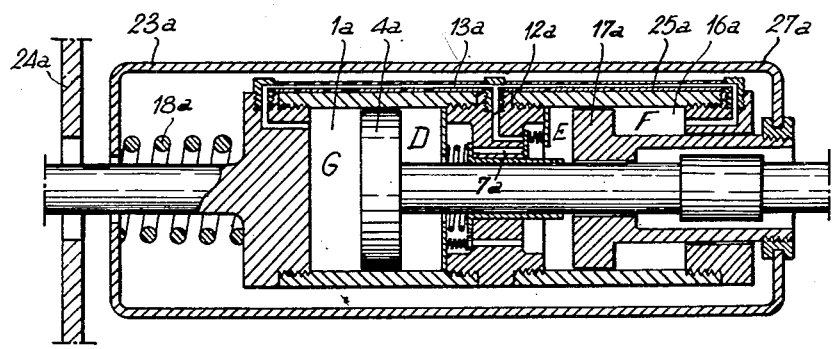

The automatic length adjusting device shown in Figs. 1 to 4 comprises a cylinder 1 which is connected to a control member (not shown) by means of a rod 2 and a socket 3. A piston 4 within the cylinder 1 is connected by the piston rod 5 to a controlled member by means of the rod 6. The piston 4 divides the cylinder into two chambers G and D, which are filled with liquid. By transferring liquid from one chamber to the other, a relative displacement of the piston 4 and of the cylinder 1 is caused and the length between the rods 2 and 6 is modified. However, owing to the incompressibility of the liquid, the stresses are transmitted by the adjusting device, as if it were rigid and the length thereof can always automatically be adapted to the needs as will be explained below.

One end of the cylinder 1 through which passes the piston rod 5, is bored to form a conduit 7. This conduit can be closed at one of its ends by a flap valve 8 urged by a spring 9 and at its other end by a valve 10, urged by a spring 11. The valve 10 simultaneously covers a hole 12 opening to a conduit 13 which leads to the chamber G. Furthermore a passage 14 which may be closed by a flap valve 15 connects the conduit 13 to an intermediate chamber E, which constitutes one of the chambers of an auxiliary cylinder 16, in which a piston 17 is urged towards the left as seen in Figure 1 by a strong spring 18. The chamber E is further connected to the chamber D of the cylinder 1 by a conduit 19 closed at the side of the chamber D by a flap valve 20, subjected to the action of a spring 21. The piston rod 22 of the piston 17 has a flange 23 which can contact a fixed stop 24.

When the rods 2 and 6 are at rest (Figure 1) the chambers G, D and E are filled with liquid, the piston 17 is in its extreme position towards the left bearing against the right end of a sleeve carrying the flap valve 8 and thereby opening the valve 8 while the valves 10, 15 and 20 remain closed. The flange 23 is spaced from the stop 24.

1. *Correct adjustment.*—A tensile force transmitted by the rod 2 pulls the apparatus towards the left. The liquid enclosed in the chamber D imparts to the piston 4 the stress received by the cylinder 1.

As long as the pull of the rod 6 is low (as in the case of the "approach period") the piston rod 5 of the piston 4 moves the rod 6 towards the left.

After a given displacement of the whole assembly the flange 23 is stopped by the stop 24 whose spacing is determined in order that the "action period" will begin at that time. The motion of the piston 17 is stopped and the spring 18 is compressed. The spring 9 can expand and apply the flap valve 8 upon its seat thus closing the conduit 7. Figure 2 shows the relative positions of the various parts of the adjusting device at this time. In such position, a stress coming from the rod 2 is transferred through the piston rod 5 to the rod 6 by the liquid enclosed in the chamber D.

When the stress upon the rod 2 is stopped the rods 2 and 6 come back towards the right under the action of the step-back devices, the flange 23 is separated from the stop 24 and the members of the adjustment device again take up their respective positions as shown in Fig. 1. It is the so-called return period.

2. *Too short adjustment.*—In this case, the action period begins before the flange 23 contacts the stop 24.

In the "approach" displacement (under a reduced stress) the operation of the adjusting device is similar to the operation of the device set forth above. However, at the beginning of the "action period," the flap valve 8 has not yet closed the conduit 7. The spring 11 being insufficient for withstanding the pressure prevailing in the chamber D, the flap valve 10 is opened and liquid flows from D to G through the conduits 7, 12 and 13. During the flow of the liquid the piston 4, the piston rod 5 and the rod 6 tend to remain in their place while the remainder of the adjusting device continues to move towards the left. The parts take the positions shown in Figure 3. After further displacement the flange 23 stops against the stop 24. The piston 17 is then stationary and the flap valve 8 is closed. The flow of the liquid from D to G is then stopped and the adjusting device having reached the desired length transfers the stress as in the "action period" of the first case. The return period also takes place in the same way.

3. *Too long adjustment.*—In this case, the "action period" begins after the stopping of the flange 23 by the stop 24. In the "approach period" the operation is similar to the case of correct adjustment above. However, the stop 24 stops the flange 23 and the flap valve 8 closes the conduit 7 before the end of such period. The displacement of the parts driven towards the left by the rod 2 however, continues. The chamber E which has its walls constituted by parts driven by the moving rod 2 and with the piston 17 held stationary is enlarged. The pressure of the chamber E becomes lower than the pressure of the chamber G and liquid passes from G to E through the conduits 13 and 14, opening the flap valve 15 (Figure 4).

The operation of the adjusting device during the "action period" is similar to the operation in the first case.

When the stress ceases and during the return period, the rods 2 and 6 come back towards the right. Under the action of the large spring 18 which urges back the piston 17, the volume of chamber E is reduced, the flap valve 15 is closed, pressure increases in E, the liquid opens the flap valve 20 and flows from E to D.

In this way, during the advance and retreating strokes, part of the liquid of chamber G passes into chamber E and then into chamber D. The piston 4 thus moves within the cylinder 1 thereby shortening the spacing between the rods 2 and 6.

During the shortening operation, liquid is transferred from G to E, thus producing a partial void in said last chamber. However, the circulation of the liquid is only possible if no void is formed in G.

The danger of void formation in chamber G is avoided in the example illustrated in Figs. 1 to 4, by the following features: on the one hand the chamber F, called the auxiliary chamber of the cylinder 16, is in permanent communication with the chamber G, by means, for example, of a conduit 25 opening into the conduit 13 as shown in Fig. 1; and, on the other hand the chamber F communicates by means, for example, of the conduit 13 and of an orifice 40 with a tank chamber 32 containing liquid for a portion of its height. The chamber 32 communicates with the atmosphere through an orifice 41.

Under these conditions, as one part of the apparatus is moved to the left, the piston 17 held by stop 24 forces the liquid of chamber F towards the chambers G and E and eventually towards the tank chamber 32. When the adjusting device comes back in the opposite direction, the liquid is forced from the chamber E towards the chamber D by the piston 17. At the same time, the piston 4 forces back liquid from the chamber G towards the chamber F and the necessary proportion of liquid comes back from the tank chamber 32 to the chamber F.

This danger of void formation in chamber G can also be avoided by connecting to the chamber G a joint chamber 50 containing air and located either within the chamber G (Fig. 8) or a chamber 51 located outside of such chamber (Fig. 9). In the last case, the chamber 51 is arranged between the cylinders 1e and 16e and a sleeve 26e. The chamber 51 is partially filled with liquid forming a spare amount. It is connected to chamber G by the conduits 33e and 34e (Figs. 10 to 12) controlled by the one-way valves 35e and 36e which enable it to change liquid with chamber G owing to the volume variations due to the displacement of piston 4e and piston rod 5e.

Figure 8:
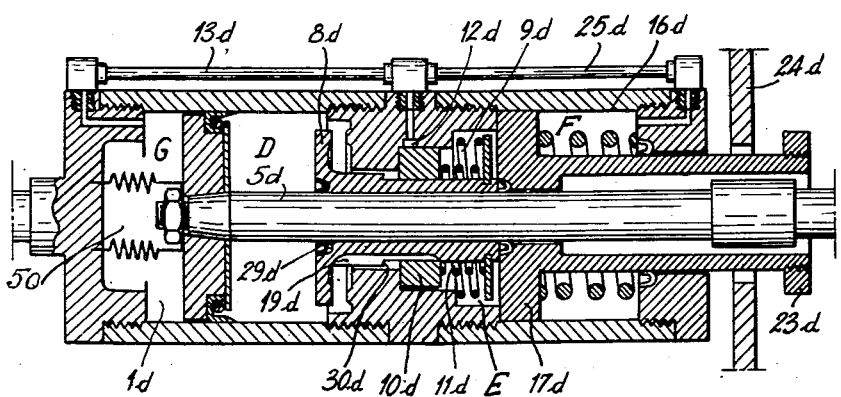

In the case of the Figures 5 and 8, the conduits 13a, 13d and 25a, 25d are constituted by sleeves which are external to the cylinders 1a, 1d and 16a, 16d.

Figure 6:
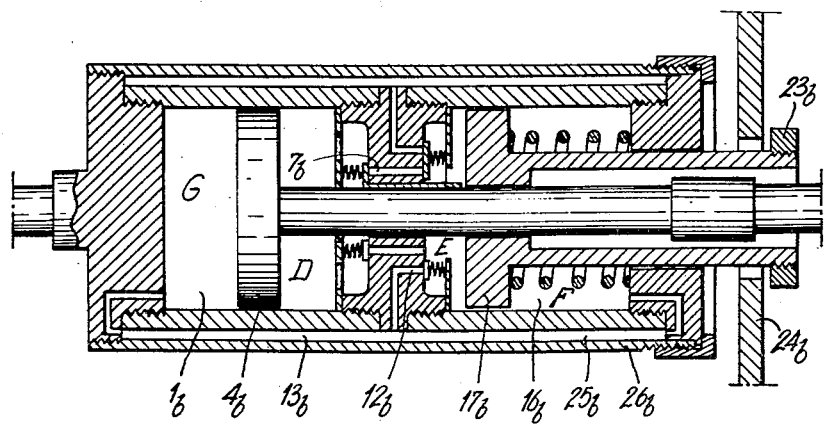

In the case of Figure 6, the conduits 13b and 25b are constituted by a chamber formed between the cylinders 1b and 16b and a cylindrical casing 26b. The annular chamber thus formed not only enables connecting the chambers G, D, E, F, to each other but also avoids pressure variations.

The stop 24b is not necessarily placed at the right of the adjusting device as shown in Figures 1, 6, 8, and 9. It can also be placed at the left, as 24a shown in Fig. 5. The flange 23a is in this case connected to the piston 17a by a sleeve 27a, enclosing the remainder of the adjusting device and thus protecting the conduits 13a and 25a. The large spring 18a can then be placed at the left of the cylinder 1a instead of being provided within the chamber F.

Figure 7:
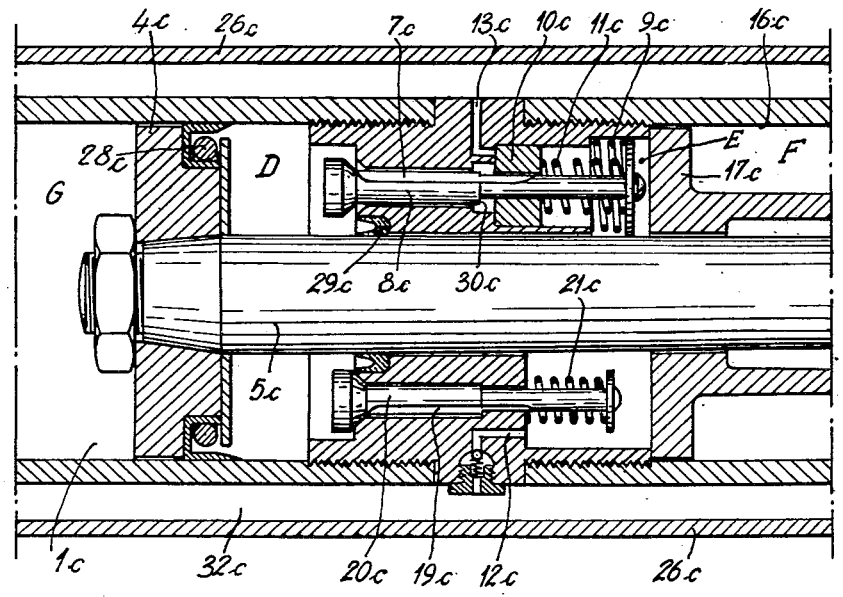

The high pressure chamber D is subjected to high pressures. For avoiding leakages the piston 4c is provided with normal packings 28c for securing tightness along the walls of the cylinder 1c and its bottom. Similar packings 29c are provided for securing tightness along the piston rod 5c as shown in Figure 7. A packing 29d, 29e securing tightness along the piston rod 5d, 5e can also be arranged upon the flap valve 8d, 8e as shown in Figures 8 and 9. The form of flap valve 8d, 8e leaves such space free for locating the packing.

The number of flap valves and springs can be reduced, as may be seen in Figures 7, 8 and 9. The valve 8c as in Figure 7 is urged towards the right by a spring 9c, which urges towards the left the flap valve 10c. The conduit 7c can be constituted by simple milling of the valve rod 8c, as shown in Figure 7.

In the same way, the conduit 19c can be constituted by milling, and even be combined with the preceding one as shown in Figures 7 to 9. In this case two springs 9c and 11c act as the springs 11, 9, and 21 of Figure 1 and the flap valve 8c as the flap valve 8. The lengths of millings are such that the flap valve 10c prevents the flow of the liquid from the chamber D towards chamber E, when the flap valve 8c is removed from its seat under the pressure of the piston 17c. On the contrary, the milled part 19c extends at the right of the flap valve 10c when the flap valve 8c rests upon its seat, thus allowing the passage of the liquid from E to D under the pressure of the piston 17c. When the valve 8c is moved towards the right, a flange 30c of the rod of the valve 8c opens the flap valve 10c and enables the flow of liquid from G to E, as in the case of a too long adjustment described above.

In the said figures, the conduits 12 and 14 are combined. The same is done for the flap valves 10 and 15.

In the various figures, the right end of the cylinder 1 and the left end of the cylinder 16 are constituted by the same piece which comprises the valve seats and upon which are all the machining operations which need careful work. The said piece can be connected by means of threading to each of the cylinders and its lateral faces bound the displacements of the pistons 4 and 17.

The adjusting devices described above are intended for transmitting tensile stresses from the left rod 2 to the right rod 6. The rods must be able to bear the stresses in the opposite direction (at the time of a manipulation for instance, or under the action of antagonistic springs) without modifying the length of the adjusting device. Now, in the case of Fig. 1, a stress from right to left, exerted upon the piston rod 5 of the piston 4, forces back the liquid from the chamber G into the conduit 13, opens the flap valves 15 and 10 and liquid enters into D thus shortening the adjusting device. The adjusting devices shown in Figs. 8 and 9 avoid this disadvantage. It is indeed sufficient if the conduits 12e open in the lateral face of the flap valves 10e, forming valve-piston. Under such conditions, under a thrust of the piston 4e from right to left, the liquid of the chamber G cannot in any way be discharged either by the conduit 12e or by the conduit 12d. In the case of Fig. 9, the flap valve 35e under the action of the loaded spring, allows the flow of liquid from the chamber G only when the pressure within the latter reaches a predetermined value. The said pressure will be chosen in order to prevent untimely forward displacements of the piston 4e.

It should also be noted that the chamber D is the only one in which a high pressure prevails. The leakages which could occur bring the liquid back to the chambers G or E, in which atmospheric pressure substantially prevails. The liquid is thus automatically recovered.

In all the figures, the stop 24 is fixed. It can also be movable provided that its displacements are different from those of the adjusting device and particularly from the flange 23.

The devices described above are all of the tensile type. The invention is not bound to the said type and also applies in the case of pushing devices.

We claim:

1. A device for automatically regulating the length of a force transmitting rod line, comprising a cylinder connected to one of the parts of the rod line, a piston connected to the other part of the rod line positioned in said cylinder and forming in the latter two chambers, one a high pressure chamber and the other a low pressure chamber, a first connecting conduit between said two chambers associated with said cylinder, an intermediate chamber interposed in said connecting conduit, a first one way valve cooperating with said first conduit controlling the flow of fluid from said high pressure chamber to said intermediate chamber through said first conduit, a second conduit connecting said high pressure chamber and said intermediate chamber, a second one way valve cooperating with said second conduit controlling the flow of fluid from said intermediate chamber to said high pressure chamber, a third conduit connecting said low pressure chamber and said intermediate chamber, a third one way valve cooperating with said third conduit controlling the flow of fluid from said low pressure chamber to said intermediate chamber, an auxiliary piston in said intermediate chamber controlling the operation of said first valve, means for moving said auxiliary piston relative to said cylinder to bring about the operation of said first valve and a reservoir for fluid having an orifice open to the atmosphere and communicating with said low pressure chamber and said intermediate chamber to maintain sufficient fluid therein to prevent voids.

2. A device for automatically regulating the length of a force transmitting rod line, comprising a cylinder connected to one of the parts of the rod line, a piston connected to the other part of the rod line positioned in said cylinder and forming in the latter two chambers, one a high pressure chamber and the other a low pressure chamber, a first connecting conduit between said two chambers associated with said cylinder, an intermediate chamber interposed in said connecting conduit, a first one way valve cooperating with said first conduit controlling the flow of fluid from said high pressure chamber to said intermediate chamber through said first conduit, a second conduit connecting said high pressure chamber and said intermediate chamber, a second one way valve cooperating with said second conduit controlling the flow of fluid from said intermediate chamber to said high pressure chamber, a third conduit connecting said low pressure chamber and said intermediate chamber, a third one way valve cooperating with said third conduit controlling the flow of fluid from said low pressure chamber to said intermediate chamber, an auxiliary piston in said intermediate chamber controlling the operation of said first valve, a projecting portion on said auxiliary piston extending externally of said cylinder, a fixed abutment in the path of said projecting portion cooperating therewith to bring about the operation of said first valve to cut off flow of fluid from said high pressure chamber to said intermediate chamber and a reservoir for fluid having an orifice open to the atmosphere and communicating with said low pressure chamber and said intermediate chamber to maintain sufficient fluid therein to prevent voids.

3. A device for automatically regulating the length of a force transmitting rod line, comprising a cylinder connected to one of the parts of the rod line, a piston connected to the other part of the rod line positioned in said cylinder and forming in the latter two chambers, one a high pressure chamber and the other a low pressure chamber, a first connecting conduit between said two chambers associated with said cylinder, an intermediate chamber interposed in said connecting conduit, a first one way valve cooperating with said first conduit controlling the flow of fluid from said high pressure chamber to said intermediate chamber through said first conduit, a second conduit connecting said high pressure chamber and said intermediate chamber, a second one way valve cooperating with said second conduit controlling the flow of fluid from said intermediate chamber to said high pressure chamber, a third conduit connecting said low pressure chamber and said intermediate chamber, a third one way valve cooperating with said third conduit controlling the flow of fluid from said low pressure chamber to said intermediate chamber, an auxiliary piston in said intermediate chamber controlling the operation of said first valve, a second cylinder surrounding said first cylinder connected to said auxiliary piston, an abutment in the path of said second cylinder and cooperating therewith to bring about the operation of said first valve and a reservoir for fluid having an orifice open to the atmosphere and communicating with said low pressure chamber and said intermediate chamber to maintain sufficient fluid therein to prevent voids.

4. A device for automatically regulating the length of a force transmitting rod line, comprising a cylinder connected to one of the parts of the rod line, a piston connected to the other part of the rod line positioned in said cylinder and forming in the latter two chambers, one a high pressure chamber and the other a low pressure chamber, a first connecting conduit between said two chambers associated with said cylinder, an intermediate chamber interposed in said connecting conduit, a first one way valve cooperating with said first conduit controlling the flow of fluid from said high pressure chamber to said intermediate chamber through said first conduit, a second conduit connecting said high pressure chamber and said intermediate chamber, a second one way valve cooperating with said second conduit controlling the flow of fluid from said intermediate chamber to said high pressure chamber, a third conduit connecting said low pressure chamber and said intermediate chamber, a third one way valve cooperating with said third conduit controlling the flow of fluid from said low pressure chamber to said intermediate chamber, an auxiliary piston in said intermediate chamber controlling the operation of said first valve, means for moving said auxiliary piston relative to said cylinder to bring about the operation of said first valve and a reservoir for fluid having an orifice open to the atmosphere and communicating with said low pressure chamber and said intermediate chamber to maintain sufficient fluid therein to prevent voids, said high pressure chamber being disposed between said low pressure chamber and said intermediate chamber so that leaks from the high pressure chamber flow into one of the other chambers and thus return into the circuit.

5. A device for automatically regulating the length of a force transmitting rod line, comprising a cylinder connected to one of the parts of the rod line, a piston connected to the other part of the rod line positioned in said cylinder and forming in the latter two chambers, one a high pressure chamber and the other a low pressure chamber, a first connecting conduit between said two chambers associated with said cylinder, an intermediate chamber interposed in said connecting conduit, a first one way valve cooperating with said first conduit controlling the flow of fluid from said high pressure chamber to said intermediate chamber through said first conduit, a second conduit connecting said high pressure chamber and said intermediate chamber, a second one way valve cooperating with said second conduit controlling the flow of fluid from said intermediate chamber to said high pressure chamber, a third conduit connecting said low pressure chamber and said intermediate chamber, a third one way valve cooperating with said third conduit controlling the flow of fluid from said low pressure chamber to said intermediate chamber, an auxiliary piston in said intermediate chamber controlling the operation of said first valve, means for moving said auxiliary piston relative to said cylinder to bring about the operation of said first valve and a reservoir for fluid having an orifice open to the atmosphere and communicating with said low pressure chamber and said intermediate chamber to maintain sufficient fluid therein to prevent voids, a second cylinder coaxial with said first named cylinder containing said intermediate chamber and limited in size by the said auxiliary piston, said first named cylinder and said second cylinder having a common partition wherein is positioned a terminal of said first conduit, and a loaded cylindrical valve controlling said terminal for the inlet of liquid into the high pressure chamber.

References Cited in the file of this patent
UNITED STATES PATENTS 1,811,913   Browall ---------------- June 30, 1931